(12) United States Patent
Qin et al.

(10) Patent No.: US 8,634,500 B2
(45) Date of Patent: Jan. 21, 2014

(54) DIRECT FEEDBACK EQUALIZATION WITH DYNAMIC REFERENCING

(75) Inventors: Zuxu Qin, Palo Alto, CA (US); Rajesh Kumar, Campbell, CA (US); Dawei Huang, San Diego, CA (US); Jing Shi, Carlsbad, CA (US); Deqiang Song, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/431,009

(22) Filed: Mar. 27, 2012

(65) Prior Publication Data

US 2013/0259162 A1    Oct. 3, 2013

(51) Int. Cl.
*H03K 9/00* (2006.01)

(52) U.S. Cl.
USPC ............ 375/316; 341/143; 375/317; 375/318

(58) Field of Classification Search
None
See application file for complete search history.

(56) References Cited

U.S. PATENT DOCUMENTS

| 6,233,273 | B1 | 5/2001 | Webster et al. |
|---|---|---|---|
| 7,986,728 | B2 | 7/2011 | Abrishamkar et al. |
| 8,270,464 | B2 | 9/2012 | Hidaka et al. |
| 2005/0201489 | A1* | 9/2005 | Mobley .................. 375/317 |
| 2009/0086865 | A1* | 4/2009 | Drapkin et al. ........... 375/350 |
| 2011/0267723 | A1* | 11/2011 | Stockinger et al. ......... 361/56 |

* cited by examiner

*Primary Examiner* — Adolf Dsouza
(74) *Attorney, Agent, or Firm* — Meyertons Hood Kivlin Kowert & Goetzel; Erik A. Heter (57) ABSTRACT

A receiver circuit includes a first slicer coupled to receive data signals from a signal path and a reference voltage from a reference voltage path that is separate from the signal path. The first slicer is configured output a logic value based on a comparison between a voltage of the data signal and the reference voltage. The receiver circuit further includes a reference voltage generator configured to generate the reference voltage. The reference voltage generator is configured to dynamically generate the reference voltage based on logic values of previously received signals during operation in a first mode. During operation in a second mode, the reference voltage generator is configured to generate and provide the reference voltage as a static voltage.

16 Claims, 5 Drawing Sheets

DIRECT FEEDBACK EQUALIZATION WITH DYNAMIC REFERENCING

BACKGROUND

1. Field of the Invention

This invention relates to electronic systems, and more particularly, to decision feedback equalization of received signals.

2. Background

As digital systems technology has advanced, data transmission rates have increased accordingly. Data transmission rates of over 1 Gb/s (gigabit per second) are commonplace in many digital system components, such as high-speed communications links digital integrated circuits. Digital signals transmitted over such high-speed communications links may be received by receiver circuits that are configured to sample received signals in order to determine their correct value (e.g., logic 0 or logic 1). Bit errors may be introduced if received signals are sampled incorrectly.

Decision feedback equalization (DFE) for sampling signals in high-speed communications linkes. In implementing a receiver configured to perform DFE, the history of previous data transmissions may be considered. More particularly, for a particular signal path, a receiver using DFE may use information about bits previously transmitted on that signal line. A DFE receiver may feed back information based on received bits to compensate for inter-symbol interference and jitter that may have been introduced by one or more previously received bits. Based on the compensation provided by the use of DFE, the occurrence of bit errors may be reduced, if not eliminated.

SUMMARY OF THE DISCLOSURE

A receiver circuit is disclosed. In one embodiment, a receiver circuit includes a first slicer coupled to receive data signals from a signal path and a reference voltage from a reference voltage path that is separate from the signal path. The first slicer is configured output a logic value based on a comparison between a voltage of the data signal and the reference voltage. The receiver circuit further includes a reference voltage generator configured to generate the reference voltage. The reference voltage generator is configured to dynamically generate the reference voltage based on logic values of previously received signals during operation in a first mode. During operation in a second mode, the reference voltage generator is configured to generate and provide the reference voltage as a static voltage.

In one embodiment, a method includes operating a receiver circuit in a first mode. During operations in the first mode, the receiver circuit is configured to compare serially received data signals received on a data path to a reference voltage generated in a reference voltage path separate from the data path. The method further includes providing as feedback to a reference voltage generator in the reference voltage path, results of each comparison of received data signals to the reference voltage. The method further includes adjusting the reference voltage using the reference voltage generator based on previous comparison results. During operation in a second mode, the reference voltage is provided as a static voltage.

BRIEF DESCRIPTION OF THE DRAWINGS

Other aspects of the disclosure will become apparent upon reading the following detailed description and upon reference to the accompanying drawings which are now described as follows.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION

Figure 1:
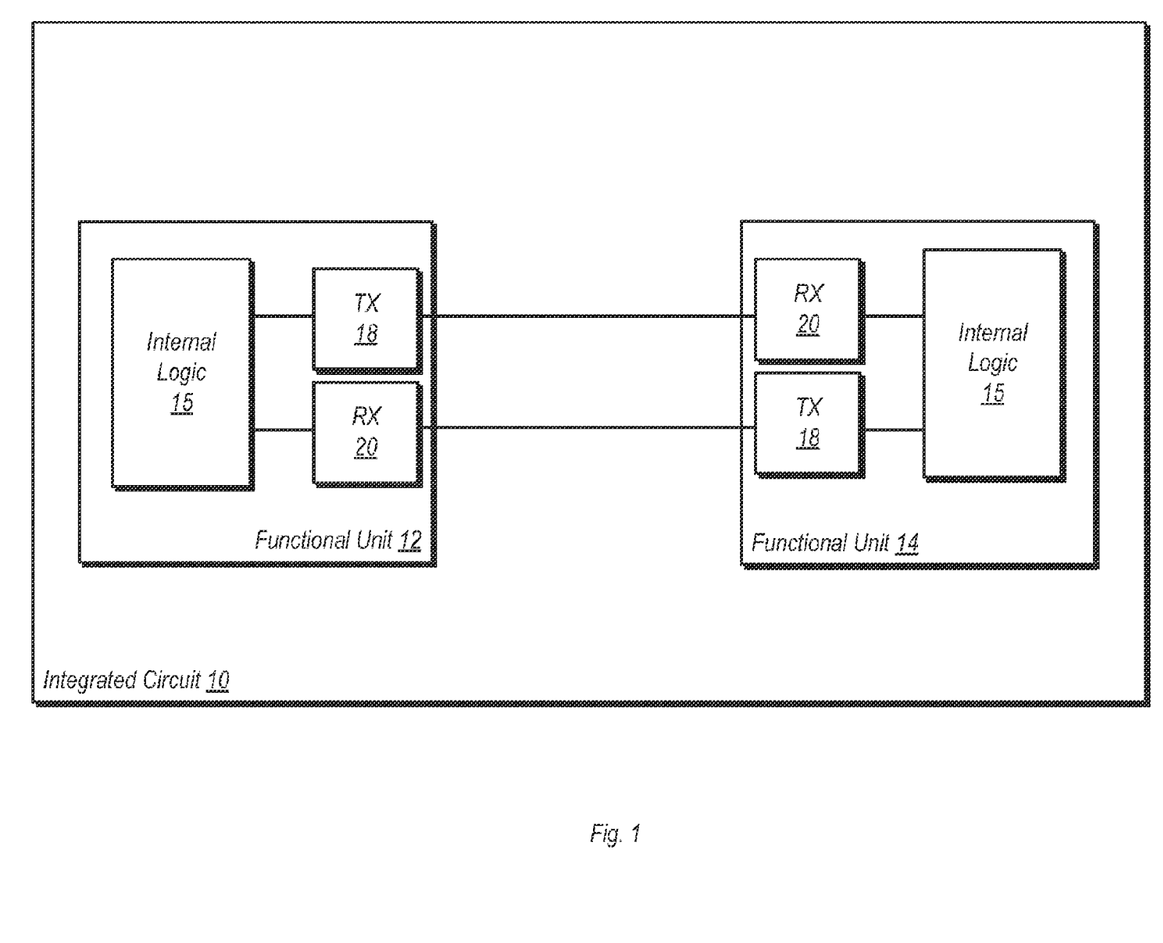
FIG. 1 is a block diagram of one embodiment of an integrated circuit.

Turning now to FIG. 1, a block diagram of one embodiment of an integrated circuit is shown. In the embodiment shown, integrated circuit 10 includes functional unit 12 and functional unit 14. Each of functional units 12 and 14 includes a respective internal logic block 15 that is configured to perform the logic functions for that particular functional unit. The internal logic blocks 15 of each of the functional units may perform different functions from one another in various embodiments.

Communication between functional units 12 and 14 may occur via transmitters and receivers implemented in each. In the embodiment shown, each of functional units 12 and 14 includes a transmitter 18 and a receiver 20. Each transmitter 18 of one of the functional units is coupled to a corresponding receiver 20 of the other functional unit. Each transmitter 18 is further coupled to receive information from internal logic 15 of its corresponding functional unit. Each receiver 20 is coupled to convey information to the internal logic 15 of its corresponding functional unit. Thus, through the transmitters 18 and receivers 20, the internal logic 15 of functional unit 12 may communicate with the internal logic 15 of functional unit 14, and vice versa.

In one embodiment, the transmitters 18 and receivers 20 are configured to communicate with each other via differential signaling. The use of differential signaling may allow for a high transfer rate of information form one functional unit to the other. Differential signaling may allow for higher transfer rates (e.g., due to common mode noise rejection. However, at times, the differential signal paths may be subject to undesirable affects such as inter-symbol interference (ISI). Accordingly, each receiver 20 in the embodiment shown is implemented as a dual mode receiver. In one operating mode, each receiver 20 may operate using decision feedback equalization (DFE), in which the history of previously received logic values is used to determine threshold voltages for evaluating the logic value of a next incoming signal. In another operating mode, the threshold voltage used for evaluating logic values may be static, with no feedback provided. Details of one embodiment of a receiver 20 and the different operating modes will now be discussed in further detail beginning with reference to FIG. 2.

Figure 2:
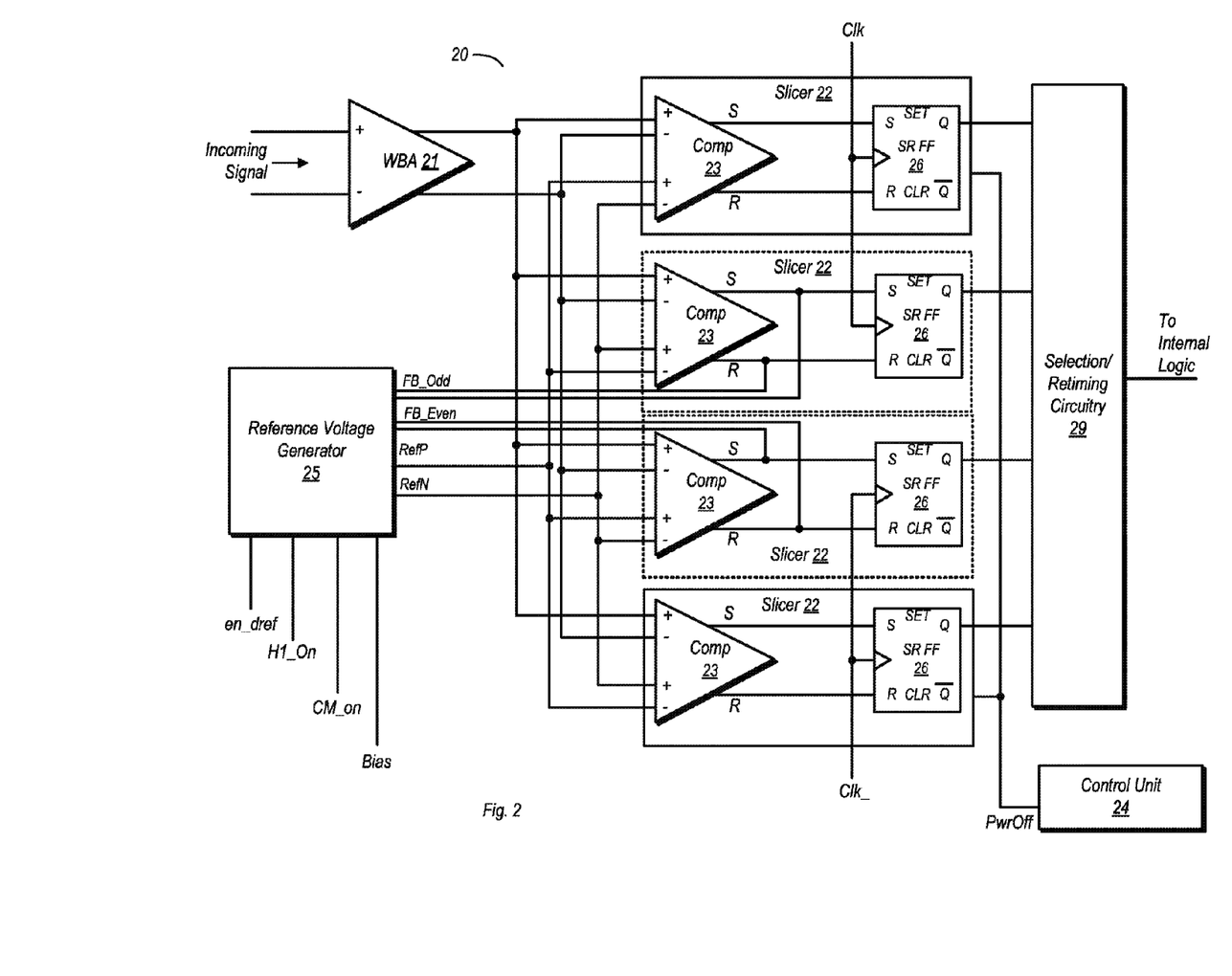
FIG. 2 is diagram illustrating one embodiment of a receiver circuit.

FIG. 2 is a diagram illustrating one embodiment of a receiver 20. In the embodiment shown, receiver 20 is configured to operate to receive data on both the rising and falling edges of a clock signal. Furthermore, receiver 20 is configured to operate in either of two different modes, one in which DFE is used to dynamically generate a reference voltage, and another mode in which the reference voltage is generated statically. As used herein, the term static reference voltage may refer to a reference voltage signal (which may be a differential signal) in which the voltage(s) remain substantially constant and do not change by design. The term dynamic reference voltage as used herein may refer to a reference voltage signal (which may also be a differential signal) that is intended to change based on feedback received by the circuitry in which the reference voltage is generated.

In the embodiment shown, an incoming differential data signal may be first received by wideband amplifier (WBA) 21. WBA 21 may amplify the incoming signal and provide a corresponding signal on its differential output. The differential output of WBA 21 in this embodiment is coupled to four different slicers 22. More particularly, each of the slicers 22 includes a comparator 23 having a first differential input coupled to the differential output of WBA 21. The comparators 23 may perform a comparison function of the amplified incoming data signal to a differential reference voltage and may generate a corresponding differential output signal indicating the evaluated logic value.

Each comparator 23 in the embodiment shown is a dual differential comparator. As noted above, a first differential input is coupled to receive the incoming differential data signal, while a second differential input is coupled to receive a differential reference voltage provided by reference voltage generator 25. During either of the operating modes of receiver 20, the active comparators 23 may compare the incoming differential data signal to the differential reference voltage to determine whether the incoming signal has a true value of a logic 1 (and complementary value of logic 0) or a true value of logic 0 (and complementary value of logic 1). If a given one of comparators 23 evaluates an incoming differential data signal as having a true value of a logic 1, it may provide a logic 1 on its 'S' output and a logic 0 on its 'R' output. If a given one of comparators 23 evaluates an incoming differential data signal as having a logic value of a logic 0, it may provide a logic 1 on its 'R' output and a logic 0 on its 'S' input.

The outputs of each comparator 23 in the embodiment shown are coupled to corresponding inputs of an SR flip-flop 26. Each of SR flip-flops 26 is configured to sample the outputs of its respectively coupled comparator 23 responsive to an edge of a clock signal. More particularly, the SR flip-flops 26 of the top two slicers 22 as shown in FIG. 2 are configured to sample the outputs of their respectively coupled comparators 23 responsive to a rising edge of the clock signal. The SR flip-flops 26 of the bottom two slicers 22 as shown in the drawing are configured to sample the outputs of their respectively coupled comparators responsive to a falling edge of the clock signal (or a rising edge of a complement of the clock signal). Accordingly, receiver 20 may receive and forward data at a rate that is twice that if only a single clock edge was used.

The 'Q' output of each of SR flip-flops 26 in the embodiment shown is coupled to selection/retiming circuitry 29. In the embodiment shown, selection/retiming circuitry 29 may, for each pair of slicers 22 (i.e., the top two being one pair, the bottom two being the other) select one of the 'Q' outputs for forwarding a signal to the internal logic of the functional unit in which receiver 20 is implemented. In addition, selection/retiming circuit 29 may perform some retiming of the signals which it receives (e.g., transferring to a different clock domain). The output of selection/retiming circuitry 29 in the embodiment may be coupled to the internal logic of the functional unit in which it is implemented.

As previously noted, receiver 20 may operate in one of two different modes. In one of the operating modes, hereinafter referred to as the static mode, the reference voltage generated by reference voltage generator is static. That is, the RefP and RefN components of the differential reference voltage are held at substantially constant levels during operation in the static mode. When operating in the static mode, all four slicers 22 are active and powered on. Although reference voltage generator 25 is coupled to receive differential feedback signals from two of the comparators 23, feedback is ignored when operating in the static mode.

The other one of the operating modes is referred to hereinafter as the dynamic mode. In the dynamic mode, the reference voltage may vary based on previously received logic values. In the dynamic mode, differential feedback signals are received from two of the comparators 23. Based on the received feedback, the levels of the differential reference voltage components may change. Both the RefP and RefN components are subject to change responsive to received feedback. Furthermore, the received feedback may at times cause the voltage of RefN component to be greater than that of the RefP component, while at other times the voltage of the RefN component may be less than that of the RefP component. It is further noted that when operating in the dynamic mode, the slicers 22 which are not coupled to provide feedback to reference voltage generator 25 (namely, the top and bottom ones shown in the drawing) may be powered down. In the embodiment shown, a control unit 24 is configured to assert a power off signal (PwrOff). Responsive to assertion of the power off signal, those slicers 22 coupled to receive it may be powered down. Accordingly, in the embodiment shown, control unit 24 is configured to assert the power off signal responsive to receiver 20 entering the dynamic mode. Although not explicitly shown, control unit 24 may receive a signal from an external source indicating the current operating mode.

Reference voltage generator 25, as noted above, is configured to generate a differential reference voltage that provides a basis of comparison to an incoming signal for each of the comparators 23. The differential reference voltage includes the components RefP and RefN in the embodiment shown. As also noted above, reference voltage generator 25 may provide the components of the differential reference voltage as static voltages or as dynamic voltages, depending on the mode of operation. During operation in the dynamic mode, reference voltage generator 25 may perform a voltage summing operation based on previously received and evaluated signals. Whereas prior art embodiments often times perform such a summing operation in the signal path (i.e. the path in which the incoming signal is conveyed to the slicers), the embodiment of receiver 20 shown in FIG. 2 implements the summing operation in the reference voltage path. Performing the summing operation in the signal path may add delay to the incoming signals and may thus reduce the possible bandwidth of a receiver arranged in such a manner. Accordingly, removing the summing operation from the signal path and instead placing it in the path of the reference voltage as in receiver 20 may allow for a higher bandwidth than might be attainable by receivers in which a summing operation is performed in the signal path.

In the embodiment shown, reference voltage generator 25 is coupled to receive a number of different signals from sources external thereto. These signals and other aspects of reference generator 25 will now be discussed in further detail with reference to FIG. 3.

Figure 3:
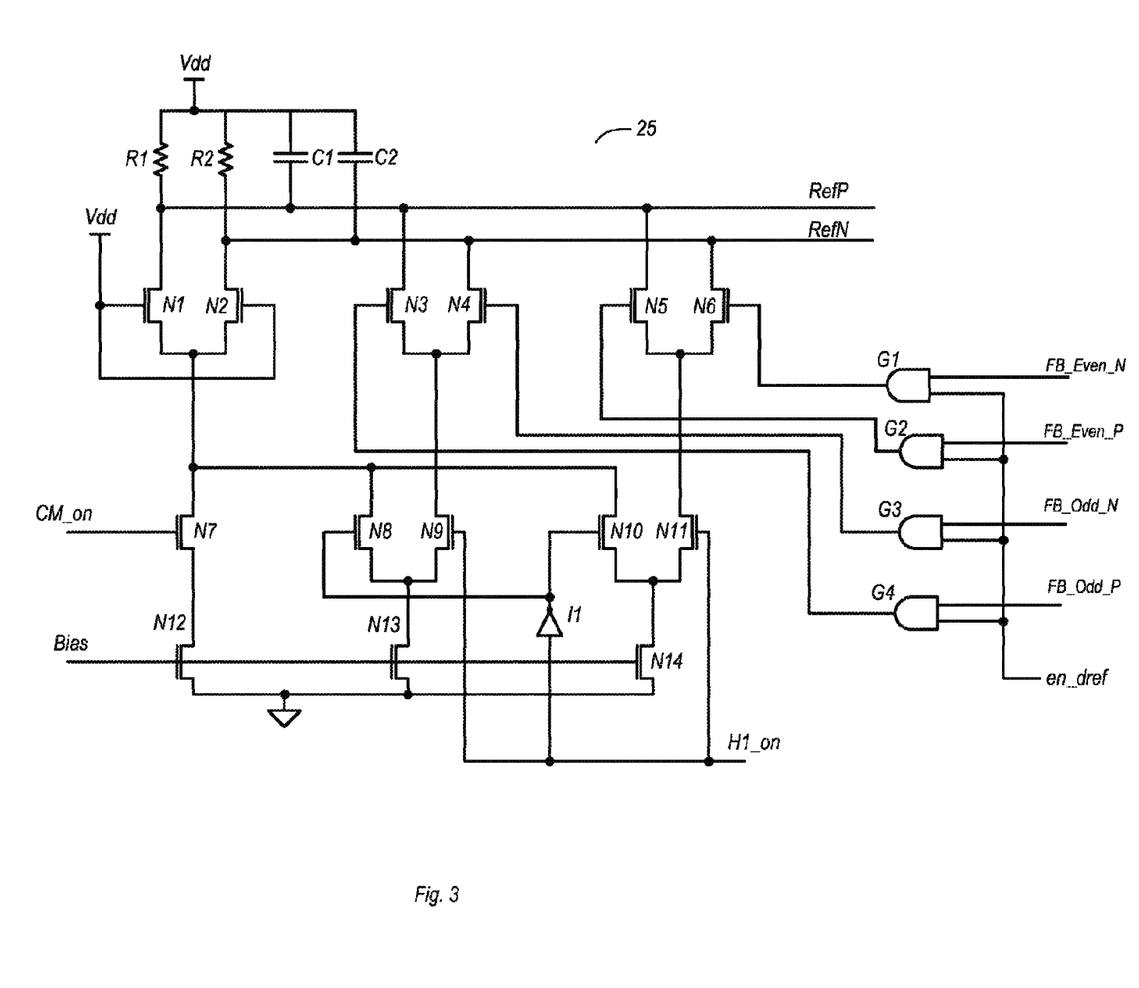
FIG. 3 is a schematic diagram illustrating one embodiment of a reference voltage generator.

FIG. 3 is a schematic diagram illustrating one embodiment of a reference voltage generator. In the embodiment shown, reference voltage generator 25 includes three differential circuit legs that may contribute to the differential reference voltage. One of the circuit legs is configured to operate in both the static and dynamic modes. The other two circuit legs in the embodiment shown are fully active only in the dynamic mode.

The first circuit leg in the embodiment shown includes transistors N1, N2, N7 and N8. Respective gate terminals of transistors N1 and N2 are hardwired to a supply voltage source (Vdd in this case) such that they are active any time power is applied. Transistor N7 in the embodiment shown is activated by the CM_on signal received on its gate terminal. The CM_on signal may be asserted whenever reference voltage generator is to be active for generating a reference voltage. Transistor N12 in the embodiment shown is coupled to receive a bias signal ('Bias'). The bias signal may be a bias voltage received on the gate of N12 that may control an amount of current flowing through the first circuit leg. In addition, transistors N13 and N14 also include gate terminals coupled to receive the bias signal. Transistor N13 and N14 may contribute to the current flowing through transistors N1 and N2 during operation in the static mode. When operating in the dynamic mode, transistors N13 and N14 may contribute to current flowing through their respectively coupled circuit legs.

When operating in the static mode, the current through each of transistors N1 and N2 may remain substantially constant. The voltage drops across R1 and R2 may thus determine the voltages of the RefP and RefN components. Capacitors C1 and C2 may provide shunting of noise on the power supply node, Vdd. Transistors N9 and N11 of the second and third differential circuits legs, respectively, remain inactive during operation in the static mode (since the H1_on signal is deasserted). Accordingly, the voltages of
RefP and RefN may remain relatively constant during operation in the static mode. Furthermore, the combined current through transistors N1 and N2 may be divided between transistors N7, N8, and N10 (along with their series coupled counterparts, N12, N13 and N14, respectively).

Operation in the dynamic mode may occur responsive to the assertion of two signals in the embodiment shown. The first of these signals is the H1_on signal. When asserted as a logic high, the H1_on signal is received on the gate terminals of N9 and N11, thereby activating these devices. Transistors N8 and N10 are deactivated responsive to inverter I1 driving the gate terminals of these devices low. The second signal asserted to place reference voltage generator 25 in the dynamic mode is an enable signal, en_dref, which may be provided by control unit 24. The en_dref signal may be received as one input for each of logic gates G1-G4 (implemented here as AND gates). Gates G1 and G2 may respectively receive components FB_Even_N and FB_Even_P of a first differential feedback signal from one of slicers 22. Gates G3 and G4 may respectively receive the FB_Odd_N and FB_Odd_P components of a second differential feedback signal from another one of slicers 22. Since FB_Even_N and FB_Even_P are of opposite polarity, the output of one of gates G1 and G2 is a logic high at given time when operating in the dynamic mode, while the output of the other gate is a logic low. Similarly, since FB_Odd_N and FB_Odd_P are of opposite polarity, the output of one of gates G3 and G4 is a logic high at a given time when operating in the dynamic mode, while the output of the other one of these gates is a logic low.

When operating in the static mode, the de-assertion of en_dref results in the outputs of all of gates G1-G4 being a logic low.

During dynamic mode operation, one of transistors N3 or N4 in the second circuit leg are active at a given time, while the other is inactive. Similarly, one of transistors N5 or N6 is active and one is inactive during dynamic mode operation. In the embodiment shown, the drain terminals of transistor N3 and N5 are coupled to the RefP node. The drain terminals of N4 and N6 are coupled to the RefN node. Accordingly, during operating in the dynamic mode, the voltages present on the RefP node at a given time depend partially on the state (active or inactive) of transistors N3 and N5. Similarly, the voltages present on the RefN node at a given time during operation in the dynamic node depend partially on the state of transistors N4 and N6.

Since each of the RefP and RefN nodes have respective drain terminals of transistors coupled thereto, a summing operation is effectively performed on these nodes. For example, the current through the RefP node, and thus the voltage present thereon, is a sum of the currents through transistors N1, N3, and N5. During those times in which either or both of transistors N3 and N5 are inactive, they effectively contribute zero current to the total current flowing through the RefP node. Furthermore, when transistors N3 and N5 are switched on and off at relatively fast rates, the charging and discharging of capacitor C1 may contribute to the current through the RefP node. Thus, as the logic values received by receiver circuit change, the current through the RefP node, and thus the voltage on that node, may change accordingly. The current through the RefP node may be maximized when transistor N3 and N5 are both active (recall that N1 is always active when the current embodiment of reference voltage generator 25 is powered on). Thus, when three transistors, N1, N3, and N5, are all drawing current through the RefP node, the voltage thereon may fall, since more current is flowing through R1, causing a larger voltage drop between Vdd and RefP. The same principle applies to the RefN node, in which the RefN node current is a sum of the currents through transistors N2, N4, and N6.

Due to the configuration of the second and third differential circuit legs, the direction of change of the voltages on the RefP and RefN may be opposite with respect to one another during operation in the dynamic mode. Thus, when the voltage of RefP is increasing, the voltage of RefN may be decreasing, and vice versa. For example, when transistors N3 and N5 are both inactive, transistors N4 and N6 are active in the illustrated embodiment. Accordingly, the current through the RefN node will be greater than that through the RefP node, and thus the RefN node will be pulled downward. Meanwhile, since no substantial current is flowing through N3 and N5 when these devices are inactive, the voltage on the RefP node will tend to rise toward the value based only on the resistance of R1 and the current through transistor N1. Similar operation may occur for the RefN node when N4 and N6 are both inactive while both N3 and N5 are active. When N3 or N5 is active while the other is inactive (and thus N4 or N6 is inactive while the other is active, respectively), the respective voltages on the RefP and RefN nodes may be a value somewhere between their maximum and minimum values. Due to the presence of capacitors C1 and C2, the voltage changes may be substantially continuous in nature.

It is noted that the embodiment of reference voltage generator 25 shown in FIG. 3 utilizes only the two most recently received logic values for determining the differential reference voltage. However, embodiments are possible in which additional circuitry is provided to allow for additional history to be used to determine the differential reference voltage.

Figure 4:
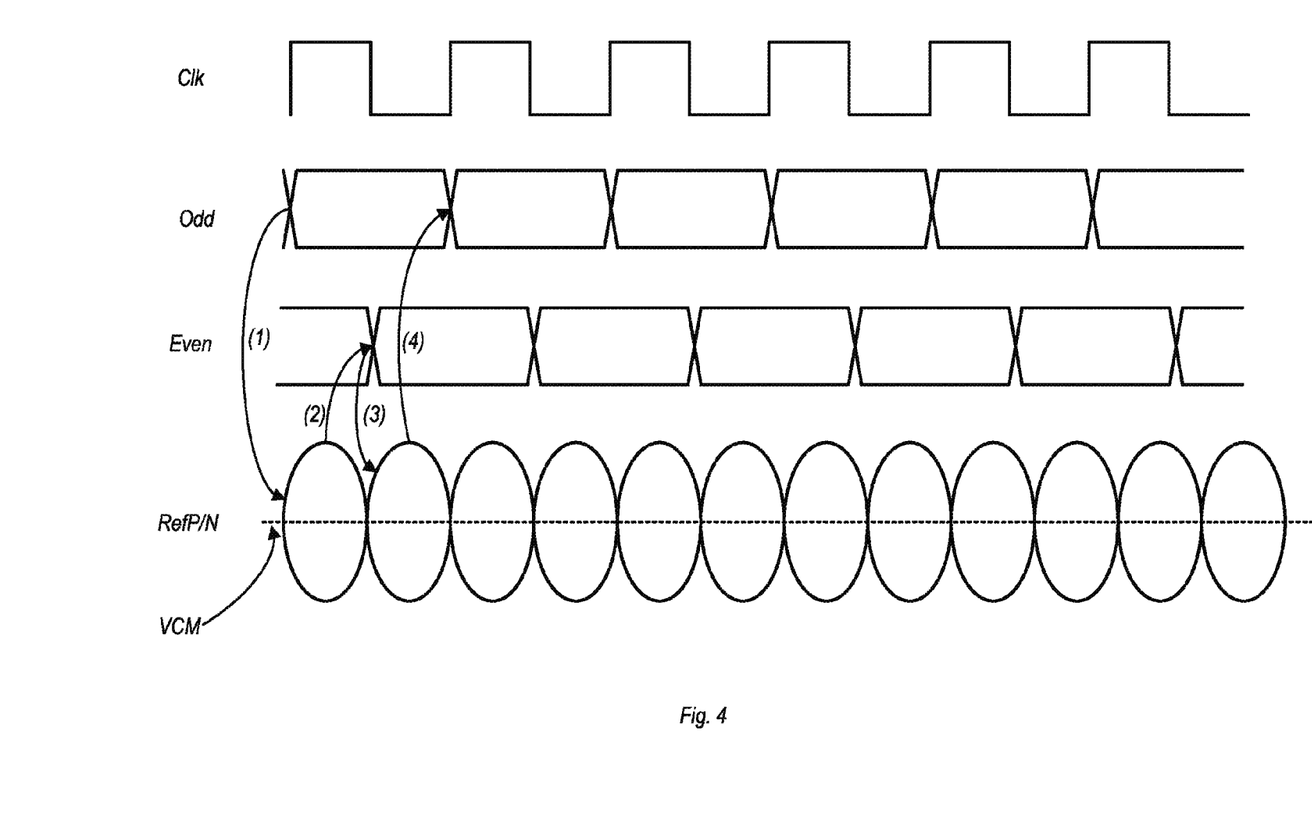
FIG. 4 is a timing diagram illustrating the operation of one embodiment of a receiver circuit utilizing dynamic reference voltage generation.

FIG. 4 is a timing diagram illustrating the operation of one embodiment of a receiver circuit utilizing dynamic reference voltage generation. The timing diagram of FIG. 4 may be depict the dynamic mode operation of various embodiments of various embodiments of the receiver circuit shown in FIG. 2.

In the illustrated example, the data stream labeled as Odd is sampled on the rising edge of the clock signal, Clk. The data stream labeled as Even is sampled on the falling edge of the clock signal. At (1), an incoming signal from the Odd data stream is sampled. When the signal is sampled, the comparator determines whether the incoming signal is a logic 0 or a logic 1 and a flip-flop may capture the determined logic value. In addition, the outputs of the comparator may be coupled to a feedback loop to a reference voltage generator. Thus, at (1), the reference voltage (shown here as RefP/N, which is a differential voltage) may be adjusted based on the feedback received from the comparator in the odd data stream.

At (2), the reference voltage, adjusted based on the previous signal value at (1), may be used as a basis for comparison for the next comparison, which is performed in the Even data stream in this example. The data in the even stream may be sampled on the falling edge of the clock signal. The logic value that is determined in the Even steram comparison may also be fed back to the reference voltage generator, causing a further adjustment in the reference voltage at (3). The further adjusted reference voltage may then be used as a basis for comparison of the next logic value to be evaluated in the Odd data stream, at (4). This cycle may repeat itself indefinitely while operating in the dynamic mode, which the reference voltage being continuously adjusted based on previously received logic values.

Figure 5:
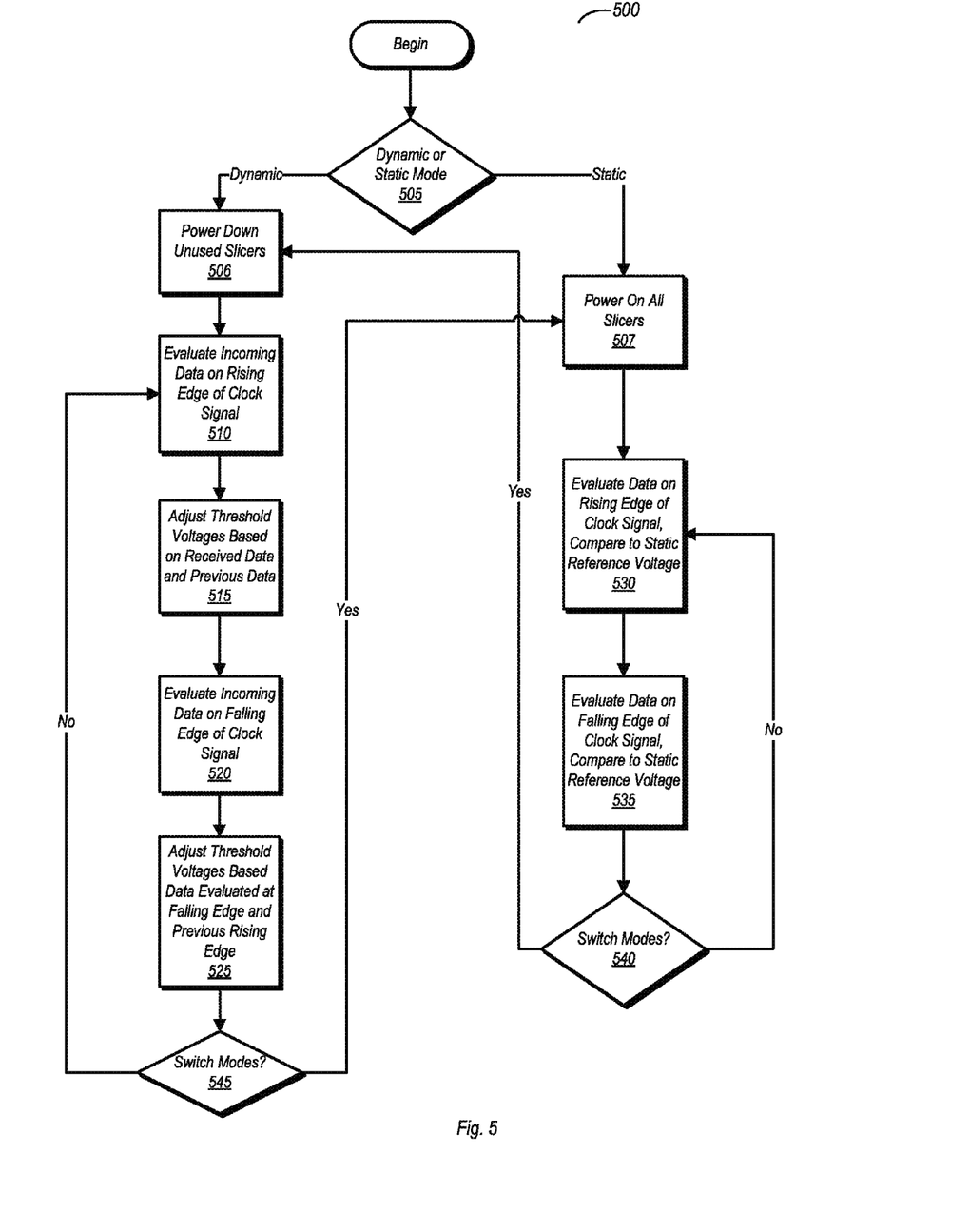
FIG. 5 is a flow diagram illustrating one embodiment of a method for operating a receiver circuit in a first mode and a second mode.

Turning now to FIG. 5, a flow diagram illustrating one embodiment of a method for operating a receiver circuit in a first mode and a second mode. Method 500 may be used to describe the operation of one embodiment of receiver circuit 20 shown in FIG. 2, any may describe other embodiments of a receiver that are not explicitly disclosed herein as well. In the embodiment shown, the first mode may be a dynamic mode in which a reference voltage is adjusted based on previously received logic values. The second mode may be a static mode in which the reference voltage remains static irrespective of previously received logic values.

When a decision is made to enter the dynamic mode (block 505, dynamic), unused slicers may be powered down (block 506) if otherwise powered up. For example, in the embodiment of FIG. 2, only those slicers having feedback inputs to the reference voltage generator remain powered on during dynamic mode operation, while the other slicers are powered down to provide power savings. As operation in the dynamic mode beings, an incoming data signal is evaluated on a rising edge of a clock signal (block 510). The evaluated data signal may also be provided to a reference voltage generator as feedback. The reference voltage generator may adjust the reference voltage based on the currently received data and previously received data (block 515). The adjusted reference voltage may be used as a basis for comparison of a next incoming data signal, which may be evaluated on a falling edge of the clock signal (block 520). The data signal that was evaluated on the falling edge of the clock signal may also be provided as feedback to the reference voltage generator, thereby resulting in further adjustment of the reference voltage (block 525). If the receiver is not is changing modes of operation (i.e. to the static mode, block 545, no), then the method may return to block 510 and repeat.

If the mode is to be changed from the dynamic mode to the static mode (block 545, yes) or operation is initiated in the static mode (block 505, static), all slicers of the receiver may be powered on (block 507). Once all slicers have been powered on, the receiver may begin receiving data in the static mode. Data may first be evaluated responsive to a rising edge of a clock signal based on a comparison of an incoming signal to a static reference voltage (block 530). The next incoming data may be evaluated responsive to a falling edge of the clock signal based on a comparison of the incoming signal to the static reference voltage (block 535).

If no mode change is made (block 540, no), then operation in the static mode continues with the method returning to block 530 and repeating the cycle. Otherwise, if the mode change is to be made (block 540, yes), method 500 advances to block 506, as unused slicers are powered down.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A receiver circuit comprising:
   a first slicer coupled to receive data signals from a signal path and a reference voltage from a reference voltage path separate from the signal path, wherein the first slicer is configured to output a logic value based on a comparison between a voltage of the data signal and the reference voltage;
   a reference voltage generator configured to generate the reference voltage, wherein the reference voltage generator is configured to dynamically generate the reference voltage based on logic values of previously received signals during operation in a first mode, and further configured to provide the reference voltage as a static voltage during operation in a second mode;
   a second slicer coupled to receive data signals from the signal path and the reference voltage from the reference voltage path;
   wherein the first slicer is configured to perform a comparison of a received data signal to the reference voltage responsive to a rising edge of a clock signal, and wherein the second slicer is configured to perform a comparison of a subsequently received data signal responsive to a falling edge of the clock signal.

2. The receiver circuit as recited in claim 1, wherein the reference voltage generator is coupled to receive, as feedback, a first output signal from the first slicer and a second output signal from the second slicer during operation in the first mode.

3. The receiver circuit as recited in claim 2, wherein the reference voltage generator includes first and second circuits configured to generate, during operation in the first mode, the reference voltage, wherein the reference voltage a sum of the first output signal and the second output signal.

4. The receiver circuit as recited in claim 3, wherein the reference voltage generator is configured to, during operation in the first mode, generate the reference voltage based on logic values of at least two previously received data signals.

5. The receiver circuit as recited in claim 3, wherein the reference voltage generator further includes a third circuit configured to generate a static reference voltage during operation in the second mode.

6. The receiver circuit as recited in claim 1, further comprising:
a third slicer configured to perform a comparison of a received data signal responsive to the rising edge of the clock signal;
a fourth slicer configured to perform a comparison of a received data signal responsive to the falling edge of the clock signal.

7. The receiver circuit as recited in claim 6, wherein the receiver circuit further includes a control unit configured to inhibit the third and fourth slicers during operation in the first mode, and further configured to provide a control signal to the reference voltage generator, wherein the reference voltage generator is configured to dynamically generate the reference voltage responsive to assertion of the control signal.

8. The receiver circuit as recited in claim 6, further comprising an amplifier having an input coupled to receive the data signals and an output coupled to respective inputs of each of the first, second, third, and fourth slicers, wherein the amplifier is configured to amplify received data signals.

9. The receiver circuit as recited in claim 1, wherein the reference voltage is differential voltage, and wherein the data signals are differential data signals.

10. A method comprising:
operating a receiver circuit in a first mode, wherein during operations in the first mode, the receiver circuit is configured to compare received data signals received on a data path to a reference voltage generated in a reference voltage path separate from the data path;
providing as feedback to a reference voltage generator in the reference voltage path, results of each comparison of received data signals to the reference voltage during operation in the first mode;
adjusting the reference voltage using the reference voltage generator based on previous comparison results during operation in the first mode;
generating the reference voltage as a static voltage, using the reference voltage generator, during operation in a second mode;
inhibiting feedback from being provided to internal circuitry of the reference voltage generator during operation in the second mode;
providing power to first and second slicers of the receiver circuit during operation in the first mode;
inhibiting power from being provided to third and fourth slicers of the receiver circuit during operation in the first mode; and
providing power to the first, second, third and fourth slicers during operation in the second mode.

11. The method as recited in claim 10, wherein adjusting the reference voltage comprises the reference voltage generator performing a summing operation based on respective logic values for at least two previously received data signals.

12. The method as recited in claim 10, wherein the data signals are differential signals, and wherein the reference voltage is a differential voltage.

13. A receiver circuit comprising:
first and second comparators each coupled to receive data signals from a data signal path and a reference voltage on respective reference voltage inputs, wherein the first and second comparators are configured to compare respectively received data signals to the reference voltage; and
a reference voltage generator configured to generate and coupled to provide the reference voltage to the first and second comparators;
wherein, during operation in a first mode, the reference voltage generator is configured to dynamically generate the reference voltage based on feedback received from the first and second comparators; and
wherein, during operation in a second mode, the reference voltage generator is configured to generate a static reference voltage;
wherein the receiver circuit further comprises third and fourth comparators coupled to receive data signals from the data signal path, wherein the third and fourth comparators are configured to be powered down during operation in the first mode and further configured to perform comparisons of respectively received data signals to the reference voltage during operation in the second mode.

14. The receiver circuit as recited in claim 13, wherein respective data signal inputs for each of the first, second, third and fourth comparators are differential signal inputs, and wherein the reference voltage is a differential reference voltage.

15. The receiver circuit as recited in claim 13, wherein the first and third comparators are configured to perform a respective comparison of a received data signal to the reference voltage responsive to a rising edge of a clock signal, and wherein the second and fourth comparators are configured to perform a respective comparison of a received data signal to the reference voltage responsive to a falling edge of the clock signal.

16. The receiver circuit as recited in claim 13, wherein the reference voltage generator is configured to, during operation in the first mode, generate the reference voltage based on the results of comparisons for at least two previously received data signals.

* * * * *

UNITED STATES PATENT AND TRADEMARK OFFICE
CERTIFICATE OF CORRECTION

PATENT NO.         : 8,634,500 B2                                                    Page 1 of 1
APPLICATION NO.    : 13/431009
DATED              : January 21, 2014
INVENTOR(S)        : Qin et al.

It is certified that error appears in the above-identified patent and that said Letters Patent is hereby corrected as shown below:

In the Specification

In column 1, line 22, delete "linkes." and insert -- links. --, therefor.

In column 4, line 31, delete "(PwrOff)." and insert -- ('PwrOff'). --, therefor.

In column 5, line 39-43, delete "RefP and RefN......... respectively)." and insert the same on Col. 5, Line 38 after "of" as a continuation of the same Paragraph.

In column 6, line 62, delete "Cl" and insert -- C1 --, therefor.

In column 7, line 26, delete "steram" and insert -- stream --, therefor.

Signed and Sealed this
Twenty-fourth Day of June, 2014

Michelle K. Lee
*Deputy Director of the United States Patent and Trademark Office*